United States Patent [19]

Cardini et al.

[11] Patent Number: 6,053,327
[45] Date of Patent: Apr. 25, 2000

[54] PROCESS FOR ENRICHING NICKEL-BEARING OXIDE ORES

[75] Inventors: Jean-Louis Cardini; Bernard Gérard Pelletier, both of Noumea, France

[73] Assignee: Societe Le Nickel-Sln, Noumea

[21] Appl. No.: 09/128,117

[22] Filed: Aug. 3, 1998

[30] Foreign Application Priority Data

Aug. 6, 1997 [FR] France ................................ 97 10074

[51] Int. Cl.$^7$ ........................................ B63B 22/31
[52] U.S. Cl. ........................ 209/3; 209/17; 209/173; 209/273
[58] Field of Search .................. 209/3, 17, 12.1, 209/172, 172.5, 173, 208, 268, 273; 241/24.1, 24.12, 24.13, 24.15, 24.25, 68

[56] References Cited

U.S. PATENT DOCUMENTS

| | | | |
|---|---|---|---|
| 3,349,903 | 10/1967 | Olsen | 209/3 |
| 4,362,558 | 12/1982 | Desnoes et al. | 75/40 |
| 4,416,768 | 11/1983 | Nosseir | 209/3 |

FOREIGN PATENT DOCUMENTS

| | | |
|---|---|---|
| 1 374 020 | 11/1974 | United Kingdom . |
| 1 542 901 | 3/1975 | United Kingdom . |

OTHER PUBLICATIONS

Database WPI Section Ch Week 8011, Derwent Publications Ltd London GB, Class M26 AN 80–19691 C, XP00 206 1994.

*Primary Examiner*—David H. Bollinger
*Attorney, Agent, or Firm*—Joseph R. Kelly; Westman, Champlin & Kelly P.A.

[57] ABSTRACT

This process for enriching nickel-bearing oxide ore comprises pulping the ore, washing the pulped ore for at least 1 minute, sorting the washed ore in a damp environment so as to separate at least one fine fraction from a granular fraction, subjecting the fine fraction to densimetric separation at a dividing density of between 1.7 and 2.5 and recovering the light fraction separated off as enriched ore.

10 Claims, No Drawings

PROCESS FOR ENRICHING NICKEL-BEARING OXIDE ORES

The invention relates to processes for enriching nickel-bearing oxide ores.

It relates more particularly to the enrichment of nickel oxide silicate ores the chemical, mineralogical and petrographical composition of which may vary widely within a seam and from one seam to the next.

Some of the neo-Caledonian ores and particularly the ores commonly known as garnieritic, like those found in the KOPETO or KONIAMBO seams are a good non-restrictive example of the type of ores to which the invention relates.

Generally speaking, it might be said that all the oxide ores for which the metallurgical extraction methods applied to them consist wholly or partially of pyrometallic processes may be suitable for enrichment by this process. In fact, in these processes, the ore is generally melted after reduction (if applicable) in electric furnaces in which the nickel and some of the iron are in the form of an alloy whilst the other elements are eliminated in a vitreous slag. These extraction processes use large amounts of energy and the higher the content of nickel at the outset the less energy is required to produce a tonne of nickel and the larger the quantity of metal produced for the same plant. The use of the process thus makes it possible either to reduce the costs of metal production or to increase the quantity of metal produced with the same equipment.

Currently, the production of ore from saprolitic nickel oxide seams is carried out in open-cast mines. The laterites, the term used for the supergeneous alteration of peridotites, which constitute the covering of the saprolitic nickel seams, are scoured and stored in appropriate sites.

Ore production is carried out after the extraction of a run of mine which contains blocks of clean peridotites of all sizes, free from nickel, taken from a nickel-rich earth matrix. This run of mine is then screened at its natural humidity using various tools (grizzly, wobbler, trommel, etc.) to separate the fine mineralised part from the coarse barren parts. This screening, sometimes accompanied by slight attrition, yields an ore of a particle size greater than 50 mm or more, frequently greater than or equal to 70 mm.

The process according to the invention consists in carrying out a selective sorting of the run of mine in order to eliminate more thoroughly the barren elements which pollute ore sorted by conventional methods.

It allows better recuperation of the seams than the conventional processes, with an increase in the ore-content. It then becomes possible to work areas where the grade of the ore sorted by conventional methods would not be economically viable and which becomes economically viable according to the process. The use of the process also makes it possible, for a given grade of ore, to increase the tonnage of workable reserves or, for the same amount of metal recovered from the same seam, it makes it possible to increase the grade, hence the yield. In still more cases, it is possible to increase both the grade of the ore and the tonnage of the recoverable reserves.

In order to attempt to increase the grade of the ores produced by mines, numerous research projects have been undertaken, notably by the present Applicant (FR-A-2 320 781). Other processes have been developed and described in a certain number of publications and prior patents.

Unfortunately, these processes, however successful, have not been able to be put into practice, particularly because of the investment costs and operating costs which they would generate.

However, a process has now been found which is particularly well suited to nickel oxide silicate ores derived from the supergeneous alteration of peridotites (predominantly harzburgites) in which the degree of serpentinisation is less than 80% ("normal", "intermediate" and "superior" facies, in SLN terminology).

The process to which the present invention relates consists in pulping the ore and is characterised in that it comprises successively:

washing the pulped ore for at least 1 minute and, preferably, for at least 2 minutes, sorting the washed ore in a damp environment so as to separate off at least one fine fraction using a mesh to separate the fine fraction from the granular fraction of between 80 microns and 3 mm and so as to leave at most only 10% by weight of fine fraction in the granular fraction, subjecting the granular fraction to densimetric separation at a dividing density of between 1.7 and 2.5 and preferably between 1.9 and 2.3 so as to obtain a light fraction and a heavy fraction, and recovering the light fraction separated off as enriched ore.

The desired enrichment can only be achieved by scrupulously following the abovementioned steps of washing, sorting under the conditions specified and densimetric separation under the conditions specified. If the prescribed conditions are not adhered to in any of the steps, the desired results will not be obtained.

In order to pulp the ore, a known quantity of ore is mixed with a given amount of water, so as to have a pulp of controlled concentration, if possible between 40 and 70 wt. % of solids, preferably between 40 and 60 wt. %.

Preferably, a run of mine ore with a particle size of less than 300 mm obtained by screening beforehand is pulped.

This pulp is then washed.

The aim of washing is to separate the fine particles from the coarser particles to which they adhere by weak forces or to separate the fine particles which are clumped together.

Preferably, the washing is carried out for 3 to 9 minutes and, particularly, for 4 to 6 minutes, using 100 to 30 parts by weight of water to 100 parts of pulp.

The washing operations may be carried out using the various methods currently used in the industry.

For example, where the quantity of fine particles is small, the ore may be washed on a screen or on a belt using a pressurised water jet.

When the quantities of fine particles are greater, more complex equipment is used such as the washing drum consisting of a cylinder mounted on a horizontal axis in which the ore and water are mixed by lifter blades fixed to the inside of the drum.

The operation may also be carried out in a concrete mixer, with 100 kg of ore being mixed at its natural humidity (of between 20 and 30%) with a quantity of water of between 30 and 50 kg. The length of time required for effective operation is at least one minute and preferably at least two minutes, but the operation may be continued for an hour or more without doing any harm.

The same equipment may be used for ores low in fine particles (known as pebbly ores).

For ores rich in fine particles, a piece of equipment known as a log-washer may also be used, which consists of an inclined bucket containing two parallel spindles fitted with blades arranged in opposite spirals. The ore is fed into the middle part of the apparatus and subjected to the stirring action of the blades, which has the effect of separating the fine particles from the granular particles. The fines are then carried by the liquid flow into the lower part where they are discharged. The granular particles are brought back up to the top and removed.

The same results can be obtained by forcing a pulp through a pipe using a pump, or by gravity. In none of these operations is there any intention of producing new fine particles by attrition, although such production does not harm the process and is beneficial.

The washed pulp is subjected to granulometric sorting so as to extract the fine fraction which is naturally rich in nickel. This operation may be carried out using known granulometric separation tools such as screens, cyclones, screw-type sizers, curved grids, etc. The choice of equipment depends essentially on the desired mesh size. However, whatever mesh is used, sorting must be carried out so as to allow not more than 10% by weight of the fine fraction to go into the granular fraction, which can be achieved in every case, if necessary by repeating the sorting operations.

The desired separating mesh size is between 80 microns and 3 mm and preferably between 200 microns and 500 microns.

The granular fraction free from fines is subjected to gravimetric separation.

The aim is to separate the particles using their difference in density so as to obtain a nickel-enriched light fraction and an impoverished heavy fraction which is barren.

This operation may be carried out using different pieces of equipment which use the force of gravity alone or in conjunction with centrifugal force.

One method consists in immersing the particles, which have previously been freed from their fine fractions, in a medium of a density somewhere between those of the two fractions which are to be separated. The fractions below the dividing density will float and can be recovered whereas the heavy fractions will sink in the medium.

The dividing density is defined as the density of the particle which has as much chance of floating as of sinking (d50 on the Tromp curve defined in the publication "La valorisation des minerais" by P. Blazy, PUF 1970, p.393). It is absolutely essential to use a dividing density between 1.7 and 2.5 and preferably between 1.9 and 2.3. When the density is below the limit, the light fraction is even more nickel-enriched but its percentage by weight is sharply reduced, which detracts from the point of the operation. Conversely, for a density above the limit, the light fraction represents a large percentage by weight, but the level of enrichment is too low.

The apparatus which may be used to carry out this operation can be divided into two categories:

separator comprising a bath of medium such as, for example, the separator drum, the Drew boy and others, centrifugal separator, such as the dense medium cyclone, the DWP (Dina Whirlpool), the Multigravity Separator, Larcodems (Large coal dense medium separator) and others.

The medium consists of a suspension of solid particles in water:

magnetite of density 5.1 to 5.1 galena of density 7.0—very rarely used ferrosilicon of density 6.7 to 7.0—may be obtained by grinding or spraying.

The medium may contain a single type of particles or a mixture, so as to obtain the desired density.

The cost of the medium means that it has to be recycled, which is made possible by its magnetic properties, enabling it to be separated from the particles of ore.

Another technique which may be used consists of making use of the ferrofluids in a magnetic field so as to obtain apparent densities greater than those of the mediums. This technique is carried out under the name of magnetogravimetric separation or "magstream".

It is also possible to use apparatus which functions with the ore pulp alone, subjected to differential acceleration brought about by oscillations (so-called jig apparatus) or by a helical movement (Reichert's cone or spiral).

It may be useful to process products of different granulometry in different tools or machines. Thus, it may be advantageous when using the mediums to process the more granular fractions (e.g. greater than 8 mm) in a bath separator such as the separator drum and the finer fractions (e.g. the fraction 200 microns–8 mm) in a centrifugal separator such as the dense medium cyclone.

Nor does it do any harm to grind the products before the gravimetric treatment; this grinding may be carried out at the natural humidity of the product using gyratory crushers or crushing rolls or even ball-mills operating under wet conditions.

When ball-mills are used they may be supplied directly with the ore pulp, the apparatus then acting as both washer and grinder. In this case, the washing/grinding operation must also be followed by a sorting operation before the gravimetric treatment. Depending on the ores to be treated, it may be beneficial to use so-called "autogenous grinders" or "semi-autogenous grinders" for this operation.

The following Examples illustrate the invention.

EXAMPLE 1

Three hundred kilograms of ore with a particle size of 0/70 mm were taken from the Kopeto seam in New Caledonia. This ore had a humidity of 25%.

We added 25 liters of water to a concrete mixer with a capacity of 300l, then we added 100 kg of the abovementioned ore so as to form a pulp containing 60% solids.

After the concrete mixer had been rotated for 15 minutes, the washed pulp thus obtained was poured onto a vibrating screen sprinkled with water, which was fitted with 3 superimposed sieves with mesh sizes of 200 microns, 10 mm and 30 mm. The oversize in each sieve was carefully washed with water so that the products remaining were perfectly clean. This operation was repeated identically three times, so as to treat all the first batch.

Thus, four fractions were obtained:

a fraction below 200 microns in the form of a very dilute pulp, a fraction from 200 microns to 10 mm resembling well washed damp sand a fraction >10 mm resembling well washed damp gravel a fraction >30 mm also resembling damp gravel.

Each fraction was weighed and then sampled so as to determine its nickel content and humidity. It was therefore possible to calculate the balance sheet of the washing and screening operation according to each granulometric fraction.

| Fraction | moist weight | % H$_2$O | dry weight (kg) | weight % | % Ni | distrib. Ni |
|---|---|---|---|---|---|---|
| >30 mm | 49.1 | 8.0 | 45.2 | 20.1 | 1.25 | 11.2 |
| 10–30 mm | 43.5 | 9.0 | 39.6 | 17.6 | 1.52 | 11.9 |
| 0.2–10 mm | 37.1 | 15.0 | 31.5 | 14.0 | 1.81 | 11.3 |
| <0.2 mm | — | 89.0 | 108.7 | 48.3 | 3.05 | 65.5 |
| Total | — | — | 225.0 | 100.0 | 2.25 | 100.0 |

The fraction larger than 30 mm considered to be too depleted was discarded.

The fraction smaller than 0.2 mm was kept separately as it was naturally rich in nickel.

The fractions 0.2–10 mm and 10–30 mm were carefully stored so as to maintain their natural humidity.

In a stirred tank with a capacity of 100 l we prepared a medium consisting of ferrosilicon, magnetite and water. To 1 kg of ferrosilicon we used 2 kg of magnetite, the total amount being adjusted so as to obtain a medium of density 2.3, in other words 1 liter of medium had a mass of 2.3 kg.

Into this tank we then poured 13 kg of the damp fraction 10–30 mm and continued stirring for 30 seconds so as to homogenise the mixture thoroughly. Stirring was then stopped and we waited for 30 seconds.

The products floating on the surface, referred to as "floaters", were recovered, carefully washed, then dried, weighed and sampled. The sample thus obtained was analysed.

The products which did not float, referred to as "sinkers", were then treated in the same way.

It was thus possible to draw up a balance sheet for the operation:

| Fraction | Dry weight (kg) | Weight % | % Ni. | Distrib. Ni |
|---|---|---|---|---|
| floaters (d < 2.3) | 5.9 | 45.4 | 2.03 | 60.6 |
| sinkers | 7.1 | 54.6 | 1.10 | 39.4 |
| (d > 2.3) Total | 13.0 | 100.0 | 1.52 | 100.0 |

This balance sheet demonstrates a substantial enrichment in floaters as the content is 0.51% Ni greater than that of the material supplied, for a yield by weight of floaters of 45.4%.

In a separation filter of 1 liter capacity we prepared a solution of organic liquor made up of bromoform and alcohol so as to obtain a solution of density 2.3, i.e. 1 liter of this solution has a mass of 2.3 kg.

We sampled the fraction $^{0.2}/_{10}$mm so as to recover 200 g representing the whole. This fraction was immersed in a mixture of water and wetting agent known by the name "Ignatovic liquor", then left for 30 minutes before being recovered and drained. This product was then placed in the organic liquor of density 2.3 and the mixture was shaken for about 20 seconds. After 20 seconds the solution was left to stand for 1 minute. At the end of the minute, the products floating on the surface of the liquor (floaters) and those which had settled on the bottom of the bulb (sinkers) were collected. The products were then rinsed and dried before being weighed and sampled for chemical analysis.

It was thus possible to draw up a balance sheet for the operation.

| Fraction | Dry weight | Weight % | % Ni | Distrib. Ni |
|---|---|---|---|---|
| floaters (d < 2.3) | 70.9 | 44.0 | 2.50 | 60.8 |
| sinkers | 89.6 | 56.0 | 1.27 | 39.2 |
| (d > 2.3) total | 160.0 | 100.0 | 1.81 | 100.0 |

Here again it can be seen that there is a substantial enrichment in nickel as the increase in content is +0.6% Ni based on the material fed in for a yield by weight of 44.0%.

If the fraction <0.2 mm of the treated ore is added to the products known as floaters obtained from the fractions $^{10}/_{30}$mm and $^{0.2}/_{10}$mm, a total concentrate is obtained which shows an increase in content which is substantial compared with the run of mine ore treated.

| | Weight % | % Ni | Distrib. Ni |
|---|---|---|---|
| CONCENTRATES | | | |
| fraction <0.2 mm | 48.3 | 3.05 | |
| floaters 0.2/10 mm | 6.2 | 2.50 | |
| floaters 10/30 mm | 8.0 | 2.03 | |
| TOTAL | 62.5 | 2.86 | 79.4 |
| BARREN ROCKS | | | |
| fraction >30 mm | 20.1 | 1.25 | |
| sinkers 0.2/10 mm | 7.8 | 1.27 | |
| sinkers 10/30 mm | 9.6 | 1.10 | |
| TOTAL | 37.5 | 1.21 | 20.6 |
| RUN OF MINE ORE | 100.0 | 2.25 | 100.0 |

EXAMPLE 2

300 kg of ore of particle size $^0$/$_{70}$mm is used, a twin sample to the one used in Example 1.

These 300 kg are placed on a 30 mm mesh vibrating screen and the product placed thereon is sprayed under a pressure of about 4 bars. Spraying is continued until the fraction held back by the screen (of a particle size greater than 30 mm) is clean.

The fraction passing through at 30 mm is then in turn placed on a 10 mm mesh screen under the same conditions as before. The fraction smaller than 10 mm is subjected to the same treatment on a 200 micron screen.

Each of the fractions thus obtained is then treated in the same way as in Example 1. A balance sheet can then be drawn up for the washing/screening operation thus carried out.

| Fraction | Dry weight (kg) | Weight % | % Ni. | Distrib. Ni |
|---|---|---|---|---|
| >30 mm | 51.7 | 22.5 | 1.30 | 12.9 |
| 10–30 mm | 43.7 | 19.0 | 1.60 | 13.4 |
| 0.2–10 mm | 49.5 | 21.5 | 2.05 | 19.4 |
| <0.2 mm | 85.1 | 37.0 | 3.33 | 54.3 |
| Total | 230.0 | 100.0 | 2.27 | 100.0 |

The fraction >30 mm is always discarded as barren.

The fractions 10–30 mm and 0.2-10 mm are subjected very precisely to the same treatment as described in Example 1. Each of these fractions therefore yields a floater and a sinker at a density of 2.3.

The final balance sheet of the operation is thus as follows:

|  | Weight % | % Ni | Distrib. Ni |
|---|---|---|---|
| CONCENTRATES |  |  |  |
| fraction <0.2 mm | 37.0 | 3.33 |  |
| floaters 0.2/10 mm | 14.0 | 2.27 |  |
| floaters 10/30 mm | 9.5 | 2.10 |  |
| TOTAL | 60.7 | 2.89 | 77.3 |
| BARREN ROCKS |  |  |  |
| fraction >30 mm | 22.5 | 1.30 |  |
| sinkers 0.2/10 mm | 7.3 | 1.62 |  |
| sinkers 10/30 mm | 9.5 | 1.10 |  |
| TOTAL | 39.3 | 1.31 | 22.7 |
| RUN OF MINE ORE | 100.0 | 2.27 | 100.0 |

EXAMPLE 3 (COMPARATIVE)

We took a sample of each of the fractions 10–30 mm and 0.2–10 mm obtained after washing/screening in Example 1. Each of these fractions was subjected to gravimetric separation under the same conditions as in Example 1, except as regards the density of the liquor and medium which were increased from 2.3 to 2.7. Floaters and sinkers were therefore found at a density of 2.7.

The performances of the operation of gravimetric sorting are thus very different, as shown below.

| Fraction | weight % | % Ni | distr. Ni |
|---|---|---|---|
| Fraction 10–30 mm |  |  |  |
| floaters (d < 2.7) | 85.2 | 1.63 | 91.3 |
| sinkers | 14.8 | 0.89 | 8.7 |
| (d > 2.7) Total | 100.0 | 1.52 | 100.0 |
| Fraction 0.2–10 mm |  |  |  |
| floaters (d < 2.7) | 85.0 | 2.00 | 93.4 |
| sinkers | 15.0 | 0.79 | 6.6 |
| (d > 2.7) Total | 100.0 | 1.81 | 100.0 |

In relation to all the treated ore, it is found that the process carried out in this way brings about a very modest enrichment.

EXAMPLE 4 (COMPARATIVE)

We took a sample of each of the fractions 10–30 mm and 0.2–10 mm obtained after washing/screening in Example 1. Each of these fractions was subjected to gravimetric separation under the same conditions as in Example 1, except as regards the density of the liquor and medium which were decreased from 2.3 to 1.5. Floaters and sinkers were therefore found at a density of 1.5.

The performances of the operation of gravimetric sorting are thus very different, as shown below.

| Fraction | weight % | % Ni | distr. Ni |
|---|---|---|---|
| Fraction 10–30 mm |  |  |  |
| floaters (d < 2.7) | 0.5 | 3.15 | 1.0 |
| sinkers | 99.5 | 1.51 | 99.0 |
| (d > 2.7) Total | 100.0 | 1.52 | 100.0 |
| Fraction 0.2–10 mm |  |  |  |
| floaters (d < 2.7) | 1.0 | 3.40 | 1.9 |
| sinkers | 99.0 | 1.79 | 98.1 |
| (d > 2.7) Total | 100.0 | 1.81 | 100.0 |

It is found that even if the enrichment is very high the yield by weight of floater is so low that the operation is of no economic interest.

EXAMPLE 5

In a pilot workshop we treated 100 tonnes of nickel oxide ore of particle size 0/300mm having a humidity of 25% using the process.

This ore was passed at a flow rate of 3 T/h to a small washer 1 m in diameter and 2.5 m long. At the entrance to the washer we added the quantity of water needed to obtain a pulp containing 60% solids.

After a retention time in the washer of 10 minutes, 35 the pulp thus obtained was screened at 30 mm, 10 mm using sprayed vibrating screens, the fraction smaller than 10 mm was screened at 200 microns on a static screening panel.

The fractions obtained were sampled and continuously weighed for the oversized materials from the screens and screening panel. The fraction smaller than 200 microns was sampled, then pumped continuously towards a storage lagoon. A measuring line consisting of an electromagnetic flowmeter and a gamma radiation densimeter was used to measure the quantity of products smaller than 200 microns.

The balance sheet of this operation is as follows:

| Fraction | Dry weight (kg) | Weight % | % Ni. | Distrib. Ni |
|---|---|---|---|---|
| 30–300 mm | 27.4 | 36.5 | 1.10 | 21.5 |
| 10–30 mm | 11.4 | 15.2 | 1.38 | 11.2 |
| 0.2–10 mm | 8.7 | 11.6 | 1.69 | 10.5 |
| <0.2 mm | 27.5 | 36.7 | 2.89 | 56.8 |
| Total | 75.0 | 100.0 | 1.87 | 100.0 |

A 40 kg sample of the 10–30 mm fraction was taken, then immersed in a medium identical to that described in Example 1, except that its density was 2.1. The balance sheet of the operation was as follows:

| Fraction | weight % | % Ni | distr. Ni |
|---|---|---|---|
| floaters (d < 2.1) | 30.0 | 2.01 | 43.7 |
| sinkers (d > 2.1) | 70.0 | 1.11 | 56.3 |
| Total | 100.0 | 1.38 | 100.0 |

A 2 kg sample of the 0.2–10 mm fraction was taken, then immersed in an organic liquor identical to that described in Example 1, but with a density of 2.45.

The balance sheet of the operation was as follows:

| Fraction | weight % | % Ni | distr. Ni |
|---|---|---|---|
| floaters (d < 2.45) | 30.0 | 2.01 | 43.7 |
| sinkers (d > 2.45) | 26.3 | 0.84 | 13.2 |
| Total | 100.0 | 1.69 | 100.0 |

EXAMPLE 6

A 60 kg sample of the 0.2–10 mm fraction obtained in Example 1 was divided into two twin samples.

One of the secondary samples thus obtained was crushed to 5 mm using a smooth-roll crusher.

The second sample was crushed to 3 mm using the same crusher.

Each of the products thus crushed was subjected to a treatment in a separation filter identical to that in Example 1 (the density of the liquor being kept at 2.3).

The balance sheet of floater was as follows:

|  | ground to 5 mm | ground to 3 mm |
|---|---|---|
| Yield by weight | 47.0 | 52.0 |
| % Ni | 2.56 | 2.52 |

EXAMPLE 7 (COMPARATIVE)

One hundred kilograms of 0.50 mm ore with a humidity of 25% and a nickel content of 2.45% were also poured as they were into a stirred tank of medium. The medium, identical to that in Example 1, had a density of 2.10.

After 30 seconds' mixing, stirring was stopped and the suspension was left for one minute with no stirring.

It is found that, under these conditions, there is virtually no separation, the fines of the ore being distributed in the medium which has become very viscous, preventing any separation.

We claim:

1. Process for enriching nickel-bearing oxide ore which comprises the following successive stages:

pulping the ore;

washing the pulped ore for at least 1 minute;

sorting the washed ore in a damp environment so as to separate off at least one fine fraction using a mesh to separate the fine fraction from a coarse fraction of between 80 microns and 3 mm and so as to leave not more than 10% by weight of fine fraction in the coarse fraction;

subjecting the coarse fraction to heavy media, sink and float, separation at a dividing density of between 1.7 and 2.5, so as to obtain a light fraction and a heavy fraction; and recovering the light fraction separated off as enriched ore.

2. Process according to claim 1, wherein the sorting is carried out at a cutoff mesh size of between 200 microns and 500 microns.

3. Process according to claim 1, wherein a run of mine ore with a particle size of less than 300 mm obtained by previous screening is pulped.

4. Process according to claim 1, wherein the washing is carried out for 3 to 9 minutes.

5. Process according to claim 1, wherein the washing is carried out using 100 to 30 parts by weight of water to 100 parts of pulp.

6. Process according to claim 1, wherein the densimetric separation is carried out in a magnetic medium.

7. Process according to claim 1, wherein the coarse fraction is ground before the gravimetric separation.

8. Process according to claim 1, wherein the fine fraction is combined with the light fraction.

9. Process according to claim 1, wherein the pulped ore is washed for at least 2 minutes.

10. Process according to claim 1, wherein the dividing density is between 1.9 and 2.3.

* * * * *